United States Patent Office 3,391,284
Patented July 2, 1968

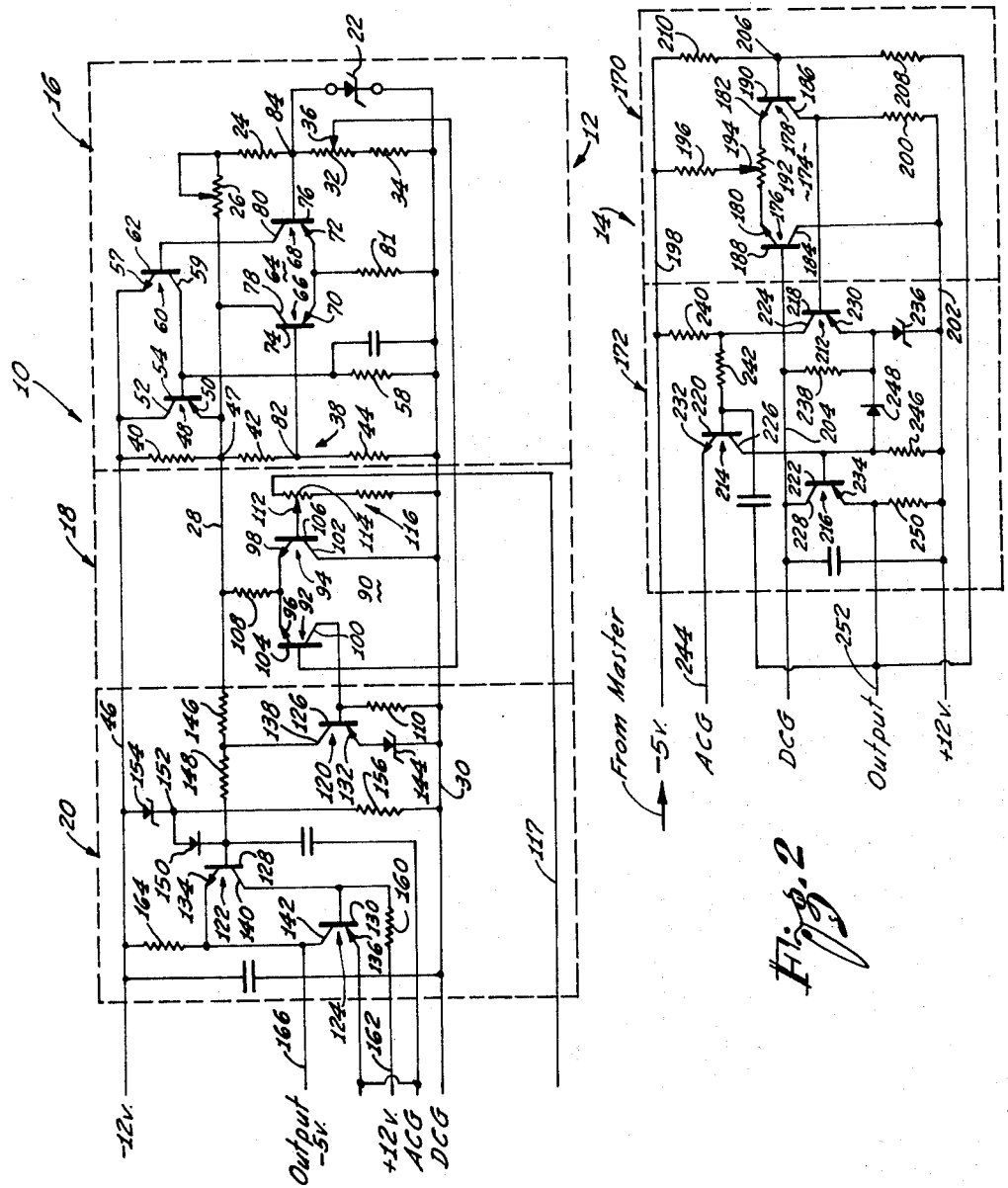

3,391,284
MASTER-SLAVE REGULATED POWER SUPPLY SYSTEM
Timothy D. Stupar, Venice, Calif., assignor to Minnesota Mining and Manufacturing Company, St. Paul, Minn., a corporation of Delaware
Filed Jan. 10, 1964, Ser. No. 337,046
11 Claims. (Cl. 307—15)

ABSTRACT OF THE DISCLOSURE

This invention relates to a power supply for providing a controlled voltage on an output load. The power supply includes a differential amplifier having first and second sides and an output. The output is connected to the load to apply the controlled voltage to the load. The first side to the differential amplifier is connected to a source of controlled voltage, the source having properties of controlling the voltage in accordance with variations in the current through the source. The second side of the differential amplifier is connected to a voltage dividing network to receive a portion of the voltage across the network. The impedance of the network is varied in accordance with the difference signal produced at the output of the differential amplifier to represent the difference between the voltages at the two sides of the amplifier. The current through the source of controlled voltage is varied in accordance with the variation in the impedance of the voltage dividing network.

---

The power supply may be considered as a master section. A slave section is also provided for producing a voltage related to the voltage on the master section.

The present invention relates to power supply means, and more particularly to voltage regulators for providing power having a very accurately controlled voltage.

It is desirable to provide power for operating electrical circuits at a voltage that is very accurately controlled and free from variations, drift, etc. Numerous means have been provided which are effective to regulate the voltage from a power supply with a reasonable degree of accuracy. However, heretofore, beyond a certain degree of accuracy the complexity and cost of such regulators have increased very rapidly as the degree of accuracy of regulation increased. As a consequence, when it has been necessary to very precisely maintain a voltage at a particular level, it has been extremely difficult and costly to do so.

In addition to being able to provide a regulated voltage having some predetermined amplitude, it is very frequently desirable to provide a second voltage having an amplitude that is maintained in some predetermined relationship to the first voltage. For example, it may be desirable to provide a pair of regulated voltages that are of opposite polarities to each other, but have identical magnitudes. Heretofore, it has been necessary to regulate both of the voltages with extreme precision so that neither of the voltages can vary outside of a very narrow region. Although each of these voltages is accurately regulated, they may vary independently of each other.

It is the purpose of this invention to overcome the foregoing difficulties by providing a power supply capable of supplying power having a very precisely regulated voltage. More particularly, it is the purpose of the present invention to provide a power supply having a voltage regulator that can produce a first voltage which is very precisely regulated and to provide a second voltage that is very precisely regulated in relationship to the first voltage. This is to be accomplished by providing a voltage regulating device such as a Zener diode and means for maintaining the regulating device at particular operating conditions whereby its operation will be very precisely uniform. In addition, one or more stages of differential amplification are arranged to sense any errors between the output voltage and the amplitude at which it is to be maintained. This, in turn, is effective to regulate the output voltage so as to reduce any error to zero. Additional voltage regulating means may be provided for providing a second or slave voltage. The additional or slave regulator is responsive to the first voltage and is effective to provide a second voltage that is a precise and constant function of the first voltage.

These and other features and advantages of the present invention will become readily apparent from the following detailed description of one embodiment, particularly when taken in connection with the accompanying drawings, wherein like reference numerals refer to like parts, and wherein:

FIGURE 1 is a schematic diagram of a master portion of a power supply embodying one form of the present invention; and FIGURE 2 is a schematic diagram of a slave portion of the power supply of FIGURE 1.

Referring to the drawings in more detail, the present invention is particularly adapted to be embodied in a power supply 10 for supplying power having a voltage that is very precisely regulated. The present power supply includes a master portion 12 that is effective to supply power at a first voltage. In addition, a slave portion 14 is provided that may be employed with the master portion 12 to supply power at a second voltage. The slave portion 14 is responsive to the voltage from the master portion 12 and is effective to maintain the second voltage in some predetermined relationship to the first voltage. As a result, if there is a minor variation in the first voltage, the second voltage will vary correspondingly whereby the two voltages will always be maintained in some predetermined relationship.

The master portion 12 of the power supply 10 includes a regulator section 16, a control section 18 and an output section 20. All three of the sections are cascaded with each other. The regulator section 16 includes a voltage regulating device that is effective to provide a constant voltage. Although this device may be of any desired variety, in the present instance a Zener diode 22 is employed. Such a diode is a semiconductive device that is reversed biased and will become conductive in the reverse direction only when the voltage thereacross reaches or exceeds a predetermined level. When the diode 22 becomes conductive the resistance decreases as the current increases. As a consequence, during conduction the diode 22 tends to maintain a substantially constant voltage thereacross.

In order to employ the Zener diode 22 as a voltage regulator it is connected in series with a load. In the present instance the load includes a pair of resistors 24 and 26 that extend between a supply line 28 and a ground line 30. If the voltage on the power supply line 28 is greater than the Zener lever of the diode 22, the diode 22 will conduct whereby a portion of the voltage will be present across the Zener diode 22 and a portion across the resistors 24 and 26. If the voltage on the supply line 28 varies it will produce fluctuations in the current flow through the series circuit formed by the resistors 24 and 26 and diode 22. This will cause the resistance of the diode 22 to vary in relation to that of the resistors 24 and 26 so as to maintain the voltage across the diode 22 constant. The resistor 26 may be made adjustable to thereby vary the load. The setting of the resistor 26 will be effective to control the amount of current flow through the diode 22 but will have very little if any effect on the voltage maintained across the diode 22.

A voltage divider 34 having a potentiometer 32 may be disposed in parallel to the diode 22. It may be seen that the diode 22 will be effective to maintain the voltage across the divider 34 constant and that the center tap 36 may be positioned to provide a regulated voltage of any predetermined amplitude up to the voltage across the diode 22.

The voltage across the Zener diode 22 and the center tap 36 will be reasonably constant. However, it is possible for the voltage to vary over a limited range due to various factors. Among other things, the resistance of the diode 22 is not precisely inverse to the current and, therefore, the voltage across the diode 2 is not totally independent of the current flowing therethrough. To obtain a precisely constant voltage across the Zener diode 22 the current through the diode 22 should be maintained constant. Therefore, additional means are provided in the regulator section 16 to supplement the resistors 24 and 26 and diode 22 and insure the voltage at the center tap 36 being accurately regulated.

The additional means will compensate for variations which might otherwise be produced by the Zener diode 22 by regulating the voltage on the supply line 28 and maintaining a constant current through the diode 22. This means includes a voltage divider 38 having a plurality of resistors 40, 42 and 44 extending from a relatively high voltage input line 46 to the ground line 30. The regulated supply line 28 is connected to the junction 47 in the voltage divider 38 and will have a voltage determined by the effective resistances in the voltage divider 38. To regulate the voltage on the supply line 28, a variable resistance is disposed in parallel to the resistor 40. By varying this resistance, the proportions of the voltage divider 38 will be changed whereby the voltage at the junction 47 and the regulated supply line 28 may be controlled.

The variable resistance in parallel to the resistor 40 may include any suitable device such as a transitsor 48 having an emitter 50, a collector 52 and a base 54. The collector 52 and emitter 50 are connected between the input line 46 and the junction 47. The emitter-collector current will thus parallel the current flowing through the resistor 40 and will be effective to partially control the voltage present at the junction 47. In order to control the emitter-collector current, the base 54 of the transistor 48 is connected to a second voltage divider formed by a resistor 58 leading to ground and a second transistor 60 having an emitter 57 extending to the power line 46 and a collector 59 extending to the resistor 58. The collector 59-emitter 57 current of the second transistor 60 will be effective to control the bias on the base 54 of the transistor 48. This in turn will determine the current flow in the voltage divider 38 and the voltage on the regulated line 28.

An error detector may be connected to the base 62 of the transistor 60 to regulate the bias thereon. The error detector includes a differential amplifier 64 having a pair of substantially identical transistors 66 and 68. The transistors 66 and 68 include emitters 70–72, bases 74–76 and collectors 78–80. The emitters 70–72 of the two transistors 66 and 68 are joined directly to each other and are connected to ground by means of a resistor 81. The base 74 of the transistor 66 is connected to a junction 82 in the voltage divider 38. The base 76 of the transistor 68 is connected to the junction 84 between the Zener diode 22 and the resistors 24 and 26. The collector 78 of the transistor 66 is connected to the regulated supply line 28 while the collector 80 of the transistor 68 is connected to the base 62 of the transistor 60.

It may thus be seen that the voltages on the bases 74 and 76 of the transistors 66 and 68 in the differential amplifier 64 will be equal respectively to the voltages at the junctions 82 and 84 in the divider 38 and at the end of the Zener diode 22. The differential amplifier 64 will be effective to amplify the difference between the voltages on the junctions 82 and 84 so that the difference between the currents in the collectors 78 and 80 will be a function of the differences between the voltages on the junctions 82 and 84.

The Zener diode 22 will be effective to maintain the voltage at the second junction 84 substantially constant. However, in the event that this voltage tends to fluctuate, it will cause the voltage on the base 76 to change. This will tend to change the amount of unbalance of the differential amplifier 64. The resultant change in the current through the collector 80 will vary the bias on the base 62 of the transistor 60. The current through the collector 59 and the resistor 58 will then change and produce a change of the potential on the base 54 of the transistor 48.

This, in turn, will change the amount of current flowing through the emitter 50 and collector 52 of the transistor 48. Since these are in parallel to the resistor 40 and form a part of the voltage divider 38, the voltage at the junction 47 will be raised or lowered depending upon whether a greater or lesser amount of current flows through the transistor 48. By a proper selection of the various parameters such as the setting of the potentiometer 26 of this circuit, the change in voltage at the junction may be made to just offset the original change whereby the voltage at the junction 84 will be retained at its exact voltage. It should be noted that since the differential amplifier 64 is responsive to the voltage drop across the two resistors 24 and 26, the current flow through these resistors and the Zener diode 22 will be maintained constant. The Zener diode 22 will thus always operate at substantially the same operating characteristics at all times. This in turn will assure the voltage at the junction 84 being extremely stable.

Since the voltage at the junction 84 will always be maintained constant, the voltage at the center tap 36 will also be accurately regulated. This center tap 36 may, of course, be adjusted to vary the voltage through a predetermined range. Although the voltage present at the center tap 36 is maintained constant, the output voltage of the power supply and particularly the voltage at the load may tend to vary somewhat as the load varies. Accordingly, the center tap 36 may be connected to the control section 18 so as to supply the regulated voltage thereto. The control section 18 will be effective to sense the tendency of the output voltage to vary and control the output voltage to compensate for the effect. As a result, the voltage at or in the load will be constant at all times even though the load may vary.

The present control section 18 includes a differential amplifier 90 that is effective to compare the voltage in or at the load with the voltage at the center tap 36. The differential amplifier 90 includes a pair of transistors 92 and 94 having emitters 96 and 98, collectors 100 and 102, and bases 104 and 106. The emitters 96 and 98 of the two transistors 92 and 94 are interconnected directly with each other. The resultant junction between the two emitters 96 and 98 is connected to a resistor 108 that leads to the controlled or regulated supply line 28.

The collector 100 of one of the transistors 92 is connected to a resistor 110 which leads to the ground to thereby form a load for the differential amplifier 90. The collector 102 of the other transistor 94 is connected directly to ground so that the collector 102 will always be maintained at ground potential.

The base 104 of the transistor 92 is connected to the center tap 36 of the potentiometer 32 in the regulator section 16. It may thus be seen that the base 104 will always be maintained at the regulated voltage produced by the regulator section 16.

The base 106 of the other transistor 94 may be interconnected with the center tap 112 of a potentiometer 114 forming a part of a voltage divider 116. One end of the divider 116 is connected to ground. The other end of the divider 116 is connected to a conductor 117 adapted to be interconnected with the output of the power supply or to the load. The divider 116 will thus have a voltage thereacross that is equal to or is some function of the voltage that it is desired to maintain constant.

It may be seen that the differential amplifier 90 will be effective to compare the voltage which it is desired to regulate with the regulated voltage at the center tap 36 of the potentiometer 32. The current from the collector 100 flowing through the resistor 110 will develop a voltage across the resistor 110 having a first part that is a function of the regulated voltage at center tap 36 and a second or error part that is a function of the difference between the regulated voltage at the center tap 36 and the voltage in the load. In other words, the voltage across the resistor 110 will be equal to a predetermined fixed voltage plus or minus an error voltage.

The proportions of the potentiometers may be such that the first potentiometer 32 will form a coarse adjustment over the output voltage while the second potentiometer 114 will form a fine adjustment over the output voltage.

The collector 100 and the end of the resistor 110 are interconnected with the output section 20. The output section 20 includes a plurality of transistors 120, 122, and 124 that are cascaded to in effect form a direct coupled three-stage D.C. amplifier. These transistors 120, 122 and 124 have bases 126, 128 and 130, emitters 132, 134 and 136, and collectors 138, 140 and 142. The base 126 of the first transistor 120 is connected directly to the resistor 110 and the collector 100. As a consequence, the base 126 will be maintained at a voltage that corresponds to the regulated voltage plus or minus an error voltage representing the difference between the regulated voltage and the voltage in the load.

The emitter 132 is connected to ground by means of a Zener diode 144. This diode 144 will thus be effective to maintain the emitter 132 at some predetermined potential with respect to the ground line 30. The collector 138 is connected to the regulated supply line 28 by means of a load resistor 146. The current flow through the collector 138 and the resistor 146 will form a signal which is a function of the regulated voltage plus or minus any errors. The second transistor 122 has its base 128 connected to the collector 138 by means of a resistor 148. The base 128 may be connected to a diode 150 that leads to a junction 152 in a voltage regulator. The voltage regulator includes a Zener diode 154 and a resistor 156 that are effective to maintain the potential at the junction 152 constant. This arrangement will be effective to permit the bias on the base 128 to vary over an extended range. However, the bias will be limited to the potential at the junction 152. The emitter 134 is connected to a output 166.

The collector 140 is connected to a load resistor 160 which runs to a positive supply line 162. The potential on this supply line 162 will, of course, correspond to characteristics of the transistor but, by way of example, may be on the order of about a +12 volts. It will thus be seen that the fluctuations in the voltage at the junction between the resistors 146 and 148 will cause the base 128 to fluctuate in a manner that will produce a current in the collector 140 and a voltage across the resistor that correspond to the regulated voltage plus or minus any errors.

The third transistor 124 has the base 130 connected to the collector 140 of the second transistor 122 whereby the base 130 will have the signal applied directly thereto. The collector 142 is connected to the negative supply line 46 by means of a load resistor 164. The output 166 may be connected directly to the collector 142.

The third transistor 124 forms a stage of power amplification which is effective to supply an adequate amount of current on the output 166 to drive the load. The voltage on the output 166 will be regulated so that the voltage in the load will be maintained substantially constant. Any fluctuations or variations in the load which might otherwise produce changes in the voltage will be compensated for by means of the control section 18.

In order to use this power supply 10 for driving a load, the lines 46 and 162 may be interconnected with suitable sources of power such as a −12 volt and a +12 volt. The load may then be connected to the output 166. The conductor 117 may be interconnected directly with the output 166 or with a portion of the load where it is desired to maintain the voltage constant. This will apply the regulated output voltage across the voltage divider 116. The center tap 36 is then adjusted to provide a voltage which is approximately equal to that which is desired. The center tap 112 is then adjusted to produce a voltage which is precisely equal to the desired voltage.

When the power supply has been adjusted in this manner, the voltage divider 38 will be effective to produce some predetermined voltage on the line 28 and the resistors 24 and 26 and Zener diode 22 will produce a second voltage at the junction 84. Any fluctuations that may tend to cause the potential at junction 84 to vary will produce variations in the resistance of diode 22. This current will flow through the resistors 24 and 26 and produce a voltage drop so that the voltage at the junction 84 will be maintained substantially constant.

In the event the voltage at the junction 84 tends to drift or change, the differential amplifier 64 will respond to the resultant fluctuations in the voltage across the resistors 24 and 26. These fluctuations will affect the balance between the potentials on the bases 74 and 76. The resultant current through the collector 80 and the emitter 72 will cause the potential on the base 62 of transistor 60 to vary. This, in turn, will cause a variation in the voltage drop across the resistor 58 which, in turn, will vary the bias on the base 54 of the transistor 48. The current through the collector 52 and emitter 50 will then vary so as to produce a change in the amount of current which is flowing through the voltage divider 38. This change will be effective to change the potential at the junction 47 and restore the voltage on the regulated line 28 so that a substantially identical voltage will be maintained across the two resistors 24 and 26. It will thus be seen that a substantially constant amount of current will flow through the Zener diode 22. As a consequence, the voltage at the junction 84 will be maintained at precisely the desired level. This, in turn, will cause the voltage at the center tap 36 to also be very precisely regulated.

The voltage selected at the center tap 36 will be applied directly to the base 104 of the transistor 92. The voltage present at the output 166 or the load will be applied to the base 106 of the transistor 94 by the divider 116. As a result, the differential amplifier 90 will be effective to sense any differences between the desired voltage and the actual voltage. This difference will be effective to unbalance the differential amplifier and produce a corresponding current through the resistor 110. The voltage across this resistor 110 will then be coupled through the transistors 120, 122 and 124 in the output section 20 so as to produce a regulated voltage on the output 166. In the event that the load tends to cause the voltage in the load to fluctuate, this will produce a corresponding change in the voltage at the center tap 112. As a consequence, there will be an error signal developed across the resistor 110. This, in turn, will be effective to cause the voltage on the output 166 to fluctuate so as to produce a compensating change whereby the voltage in the load will remain constant.

It will thus be seen that the master portion 12 of the power supply 10 described above will be effective to maintain an absolutely constant voltage on the output 166. This voltage will be of some particular polarity with respect to the ground line 30. In the event that it is desired to have a second voltage which is also accurately regulated and is correlated to the first voltage, the slave portion 14 may be provided. The present slave unit 14 is adapted to provide a second voltage that is of identical amplitude but of opposite polarity. The slave 14 includes a control section 170 and an output section 172.

The control section 170 may be similar to control section 18. It includes a differential amplifier 174 having a pair of transistors 176 and 178 therein. These transistors 176 and 178 include an emitter 180 and 182. collector 184 and 186 and base 188 and 190. The two emitters 180 and 182 are connected together by means of a potentiometer 192 having a movable center tap 194. The center tap 194 is, in turn, interconnected with a resistor 196 which leads to a supply line 198. This supply line 198 is interconnected with a source of the voltage with which the slave 14 is to be correlated. By way of example, the supply line 198 may be connected with the output 166 of the master unit 12.

It will thus be seen that the voltage on this reference line 198 will be identical to the voltage from the master unit 12. The center tap 194 may then be adjusted so as to provide a balance between the potentials on the two emitters 180 and 182.

The collectors 184 and 186 of the transistors 176 and 178 may be interconnected with a supply line 202 adapted to be connected to a source of positive voltage such as a positive 12 volts. The collector 184 may be connected directly to the line 202. The other collector 186 is connected to the line 202 by a resistor 200 that forms a load for the amplifier 174.

The base 188 of the transistor 176 is connected directly to a D.C. ground line 204. The base 190 of the other transistor 178 is interconnected with a junction 206 between a pair of identical resistors 208 and 210. These resistors 208 and 210 are interconnected with the reference line 198 and with the output.

The two resistors 208 and 210 will have the regulated voltage from the master unit 12 on one end and the regulated voltage from the slave 14 on the other end. If these two voltages are of absolutely identical amplitude but of opposite polarity, the junction 206 will be at ground level. As a result, the bases 188 and 190 of the two transistors 176 and 178 will both be at ground level and the amplifier 174 will be balanced. However, in the event that the amplitudes of the voltages are not identical, the junction 206 will be either positive or negative with respect to ground, depending upon which voltage is greater. This, in turn, will cause the differential amplifier 174 to be unbalanced.

The output section 172 may be similar to the output section 20 in the master unit 12. The section 172 includes three transistors 212, 214 and 216 having bases 218, 220 and 222, collectors 224, 226 and 228 and emitters 230, 232 and 234. The base 218 of the first transistor 212 is connected to the load 200 in the differential amplifier. The base 218 will thus be at a potential that is a function of the difference between the master and slave voltages. The emitter 230 is connected to the positive supply line 202 by means of a Zener diode 236 and to ground by means of a voltage regulating resistor 238. This diode 236 will thus be effective to maintain the emitter 230 at a potential having some predetermined difference from the positive supply line 202.

The collector 224 of the transistor 212 is connected to the negative supply line 198 by means of a load resistor 240. It will thus be seen that the signal in the differential amplifier 174 and across the resistor 200 will be fed directly to the base 218 of the transistor 212 so as to produce a current flow through the load resistor 240.

The second transistor 214 has its base 220 connected to the collector 224 by means of a resistor 242. The emitter 232 is connected directly to the AC ground connector 244. The collector 226 of this transistor 214 is connected to the positive supply line 202 by means of a load resistor 246. Thus, the amplified signal will be developed across this resistor. The collector 226 may be connected to the junction between the resistor 238 and Zener diode 236 by means of a diode 248. This will be effective to limit the maximum signal that may be created across the resistor 246.

The third transistor 216 has its base 222 connected to the load resistor 246 so as to be maintained at the potential thereof. The collector 228 is connected to D.C. ground line 204. The emitter 234 is connected to the positive supply line 202 by means of a load resistor 250. The output 252 is connected to the load resistor 250. The output 252 will thus have a potential relative to the D.C. ground line 204 that is the same as the voltage between the collector 228 and the emitter 234.

The slave unit 14 receives the negative regulated voltage from the master 12 and applies this voltage directly to one end of the resistors 208 and 210. The opposite end of the resistors 208 and 210 is connected to the output 252 of the slave 14 or to the load for the slave 14 to receive the voltage therefrom. In the event these two voltages are of identical magnitude, the junction 206 between the resistors 208 and 210 will be at D.C. ground. Both of the bases 188 and 190 will then be at identical potentials and the differential amplifier 174 will be balanced. This will produce a predetermined voltage across the load resistor 200. This voltage will be coupled to the output section 172 where it will be amplified by the three cascaded transistors 212, 214 and 216. The transistor 216 will function as a power amplifier and produce a current on the output 252 at a voltage which is identical to that on the reference line 198. In the event the voltage from the master unit 12 tends to vary or the voltage from the slave 14 tends to vary, the voltage across the two resistors 208 and 210 will become unbalanced. The junction 206 between the resistors 208 and 210 will then no longer be at ground potential. This, in turn, will unbalance the differential amplifier 174. The voltage across the resistor 200 will then include an error component. This error signal will be amplified in the three transistors 212, 214 and 216 and produce a corresponding change in the output voltage which will return it to an amplitude that is equal to the potential on the output 166.

It may thus be seen that a master power supply 12 and slave 14 have been provided which are effective to produce a pair of very accurately regulated voltages. The absolute potential of both of these voltages will be very precisely controlled. In addition, in the event that there may be minor fluctuations or variations in one or the other of the voltages, the slave unit 14 will be effective to compensate for such fluctuations whereby the two voltages will be maintained at identical amplitudes. This will insure the sum of these two voltages being equal to the ground potential at all times.

Although particular voltage regulating means have been disclosed and described herein, it will be readily apparent to persons skilled in the art that numerous changes and modifications may be made without departing from the spirit of the invention. Accordingly, the foregoing disclosure and description thereof are for illustrative purposes only and do not in any way limit the invention which is defined only by the claims which follows.

What is claimed is:

1. A voltage control for regulating the voltage from a power supply, said voltage control including the combination of:
   a voltage divider connected to the power supply and having said voltage from the power supply applied across the voltage divider,
   a junction point in said divider having a potential at the junction point that is a portion of the voltage from said power supply,
   first means disposed in parallel with at least a portion of said voltage divider and having variable characteristics to vary the potential at said junction point in accordance with such variable characteristics,
   constant voltage means having variable characteristics to maintain a substantially constant voltage across the constant voltage means, second means including a load connected between said junction point and said constant voltage means to provide for a flow of current through the load in accordance with the potential at the junction point and for a flow of at least a portion of such current through said constant voltage means, and third means responsive to the amount of current flowing through said load and interconnected with said first means for varying the first means to vary the potential at said junction point to maintain a constant current flow through said load.

2. A voltage control for regulating the voltage from a power supply, said voltage control including the combination of:

a voltage divider interconnected with the power supply and having said voltage from the power supply applied across the voltage divider, a junction point in said divider having a potential at the junction point that is a portion of the voltage from said power supply, a Zener diode having variable characteristics to maintain a substantially constant voltage across the Zener diode, means including a load connected between said Zener diode and said junction point to provide for a flow of current through the load in accordance with the potential at the junction point and to provide for a flow of at least a portion of such current through the diode, and means responsive to the current flow through said load and interconnected with said voltage divider for varying the potential at said junction point to maintain a constant current through said load.

3. A voltage control for regulating the voltage from a power supply, said voltage control including the combination of:

a voltage divider interconnected with the power supply and having said voltage from the power supply applied across the voltage divider, first and second junctions in said divider respectively having first and second potentials that are portions of the voltage from said power supply, a Zener diode having variable characteristics to maintain a substantially constant voltage across the Zener diode, a load resistor, first mean interconnecting the Zener diode and the load resistor in electrical circuitry with the first junction to provide a current flow through the load resistor in accordance with the first potential and to provide for a flow of at least a portion of such current through the Zener diode, a differential amplifier having a pair of opposite sides and responsive to the voltage differential between said opposite sides to provide a difference signal and with one side of said amplifier connected to the second junction and responsive to said second potential and with the other side of said amplifier connected to the Zener diode and responsive to the voltage across the Zener diode, and means interconnected with said differential amplifier and responsive to the differential signal from said amplifier and also interconnected with at least a portion of said voltage divider to vary the potential at said first junction of the voltage divider in accordance with such difference signal to maintain the substantially constant voltage across said Zener diode.

4. A voltage control for regulating the voltage from a power supply, said voltage control including the combination of:

a voltage divider interconnected with the power supply and having said voltage from the power supply applied across the voltage divider and with said voltage divider including a plurality of resistors connected together to form at least a pair of junctions and with the first of said junctions having a first voltage that is a first function of the voltage from the power supply and with the second of said junctions having a second voltage that is a second function of the voltage from the power supply, a Zener diode having variable characteristics to maintain a substantially constant voltage across the Zener diode, a load resistor, means connecting the load resistor and the Zener diode in electrical circuitry with at least the first junction to produce a current flow through the load resistor in accordance with the first voltage and to produce a flow of at least a portion of such current through the Zener diode, a differential amplifier having a pair of opposite sides and responsive to the voltage difference between said opposite sides to provide a difference signal and with one side of said amplifier connected to the second junction and with the other side of said amplifier connected to the Zener diode and responsive to the substantially constant voltage across said Zener diode, and means having a variable resistance interconnected with said differential amplifier and responsive to said difference signal to provide variations in resistance in accordance with said difference signal, said variable resistance means also being connected to said voltage divider in parallel with one of said plurality of resistors to vary the effective resistance of said one resistor in the voltage divider in accordance with the variations in resistance of the variable resistance means and thereby vary the first voltage at said first junction to maintain a substantially constant voltage across said Zener diode.

5. A voltage control interconnected with a load to supply a controlled voltage to said load, said voltage control including the combination of:

first means for producing a voltage having a predetermined magnitude, output means having an input and an output and constructed to provide the controlled voltage at the output and having the output connected to the load, the output means including voltage-dividing means constructed to provide at least a portion of the controlled voltage, a differential amplifier having first and second sides and having an output and having the first side connected to said first means and responsive to said voltage of said predetermined magnitude and having the second side interconnected with said output of said output means and responsive to the controlled voltage on said output of said output means, said differential amplifier being constructed to produce on said output a signal that is a function of the difference between the voltages on said first and second sides, and means interconnecting the output of said differential amplifier with the input to said output means to produce the controlled voltage across the load.

6. A voltage control interconnected with a load to supply a controlled voltage to said load, said voltage control including the combination of:

first means for producing a voltage having a predetermined magnitude, output means having an input and an output and constructed to produce a controlled voltage at the output and with said output interconnected with said load for maintaining said load at the controlled voltage, said output means including voltage-dividing means constructed to provide at least a portion of said controlled voltage, a differential amplifier having a first side, a second side and an output and with said differential amplifier responsive to the difference between the voltages on said first and second sides to provide a difference signal on said output that is a function of the difference between the voltages on said sides, second means interconnecting the output from said differential amplifier with the input to said output means, third means interconnecting the first side of said differential amplifier with said first means and with said first side of said differential amplifier responsive to said voltage having the predetermined magnitude, and fourth means interconnecting the second side of said differential amplifier with the voltage-dividing means to introduce at least the portion of the controlled voltage to the second side of said differential amplifier.

7. A voltage control interconnected with a power supply source having a first voltage and interconnected with a load for supplying a controlled voltage to said load, said voltage control including the combination of:

regulating means interconnected with said power supply source to regulate the first voltage from said power supply source to provide a second voltage, output means interconnected with said load for supplying a third voltage to said load, said output means including voltage-dividing means for providing at least a portion of said third voltage, a differential amplifier having a pair of opposite sides and an output and with said differential amplifier amplifying the difference between the voltages on the pair of opposite sides to provide a signal on said output, means interconnected with the regulating means and the one side of said differential amplifier to maintain said one side at the second voltage, means interconnected with the voltage-dividing means and the other side of said differential amplifier to couple at least the portion of said third voltage to said other side, and means interconnecting said output of said differential amplifier with said output means to vary the third voltage supplied by said output means in accordance with the amplified difference voltage from the differential amplifier to maintain a predetermined difference between the voltages on said sides of said differential amplifier.

8. A voltage control interconnected with a power supply source having a first voltage and interconnected with a load for supplying a controlled voltage to said load, said voltage control including the combination of:

regulating means interconnected with said power supply source and constructed to regulate the first voltage from said power source to provide a second voltage, output means having an input and an output and constructed to provide a voltage on the output that is a function of the voltage on said input, the output means including voltage-dividing means constructed to provide at least a portion of the voltage on the output of the output means, means interconnecting the output of said output means with said load for supplying said voltage on said output to said load, a differential amplifier having a first side, a second side and an output and with said differential amplifier amplifying the difference between the voltages on said first and second sides to provide a signal on said output, means interconnected with the regulating means and the first side of said differential amplifier to maintain said first side at said second voltage, means interconnected with the voltage-dividing means and with the second side of said differential amplifier to maintain said second side at a voltage corresponding to at least the portion of the voltage on said output of the output means, and means interconnecting the output of the differential amplifier with the input to said output means to introduce said voltage difference to the output means to provide variations in the voltage on the output of the output means in accordance with variations on the input of the output means for maintaining the voltage on said output of the output means at the controlled level.

9. A voltage control for supplying a master voltage and for supplying a slave voltage, said voltage control including:

a master regulator section having an output for providing the master voltage, the master regulator section including voltage-dividing means for providing at least a portion of the master voltage, a slave section having an input and an output for introducing a voltage to said input and for providing from the output a slave voltage that is a function of the voltage on said input, a differential amplifier having a pair of sides and an output and with said differential amplifier amplifying the difference between the voltages on said pair of sides to provide a signal on the output of the differential amplifier, the differential amplifier being included in the master regulator section and in the slave section, means interconnecting at least one side of said differential amplifier with the voltage-dividing means to introduce at least the portion of the master voltage to the one side of the differential amplifier, means in the master regulator section for providing a reference voltage, means interconnecting the reference voltage means with the other side of the differential amplifier to introduce the reference voltage to the other side of the differential amplifier, and means interconnecting the output of said differential amplifier with the input of said slave section to vary the slave voltage at the output of the slave section in response to said master voltage.

10. A voltage control for supplying a master voltage and for supplying a slave voltage that is related to the master voltage, said voltage control including:

a master regulator section having an output for providing the master voltage, the master regulator section including voltage-dividing means for providing at least a portion of the master voltage, a slave section having an input and an output for providing the slave voltage at the output, a differential amplifier having a pair of sides and an output and with said differential amplifier amplifying the difference between the voltages on said pair of sides to provide a signal on said output of the differential amplifier that is related to the difference between the voltages on the pair of sides, the differential amplifier being included in the master regulator section and the slave section, means interconnecting one side of said differential amplifier with the voltage-dividing means to provide said one side with at least the portion of the master voltage, a source of a reference voltage included within the master regulator section, means interconnecting the other side of said differential amplifier with said source of reference voltage to maintain said other side at said reference voltage, and means interconnecting the output of the differential amplifier with the input to the slave section.

11. A voltage control for supplying a master voltage and for supplying a slave voltage that is related to the master voltage, said voltage control including:
a master regulator section having an output for providing the master voltage, the master regulator section including voltage-dividing means for providing at least a portion of the master voltage,
a slave section having an input and an output for providing the slave voltage related to the voltage signal on said input,
a differential amplifier having a first side and a second side and an output and with said differential amplifier amplifying the difference between the voltages on said two sides to provide a signal on said output of the differential amplifier that is a function of the difference between the voltages on the two sides,
means connecting the voltage-dividing means with said first side of said differential amplifier to provide the first side with at least the portion of the master voltage,
a reference source included in the master regulator section and having characteristics variable with current to provide a predetermined reference voltage,
means included in the master regulator section and connected between the voltage-dividing means and the reference source to vary the current through the reference source in accordance with variations in voltage in the voltage-dividing means to maintain the predetermined reference voltage in the reference source,
means interconnecting the second side of said differential amplifier with said reference source to maintain said second side at said reference voltage, and
means interconnecting the output of the differential amplifier with the input to the slave section.

References Cited

UNITED STATES PATENTS

| | | | |
|---|---|---|---|
| 2,942,174 | 6/1960 | Harrison | 323—22 |
| 2,981,884 | 4/1961 | Tighe | 323—22 |
| 3,090,905 | 5/1963 | Ehret | 323—22 |
| 3,101,442 | 8/1963 | Darbie et al. | 323—22 |
| 3,103,617 | 9/1963 | Schneider et al. | 323—22 |
| 3,114,873 | 12/1963 | Love | 323—22 |
| 3,163,814 | 12/1964 | Todd | 323—22 |
| 3,174,094 | 3/1965 | Farnsworth et al. | 323—18 |
| 3,185,912 | 5/1965 | Smith et al. | 323—22 |
| 3,258,603 | 6/1966 | Wright et al. | 307—86 |
| 3,273,042 | 9/1966 | Tuszynski | 321—16 |

JOHN F. COUCH, *Primary Examiner.*

WARREN E. RAY, *Assistant Examiner.*